(12) United States Patent
Albertshofer

(10) Patent No.: US 6,230,081 B1
(45) Date of Patent: May 8, 2001

(54) INFORMATION SYSTEM FOR GOLF CARTS AND SYSTEM FOR CALCULATION OF USE AND/OR ACQUISITION OF USE DATA

(76) Inventor: Christian Albertshofer, Mozartatranna 11, D.85276 Pfaffenhofen (DE)

( * ) Notice: Subject to any disclaimer, the term of this patent is extended or adjusted under 35 U.S.C. 154(b) by 0 days.

(21) Appl. No.: 09/125,063
(22) PCT Filed: Feb. 15, 1997
(86) PCT No.: PCT/DE97/00327
  § 371 Date: Aug. 7, 1998
  § 102(e) Date: Aug. 7, 1998
(87) PCT Pub. No.: WO97/29810
  PCT Pub. Date: Aug. 21, 1997

(30) Foreign Application Priority Data

Feb. 15, 1996 (DE) .............................................. 196 05 682
Sep. 27, 1996 (DE) .......................................... 296 16 667 U

(51) Int. Cl.⁷ ................................ G06F 7/00; G06F 17/00
(52) U.S. Cl. .................................. 701/1; 705/32; 705/52; 235/375; 235/378; 235/380
(58) Field of Search .......................... 701/1; 340/825.31, 340/825.34, 991, 992; 235/375, 378, 380, 382, 382.5, 435; 705/50, 52, 30, 32

(56) References Cited

U.S. PATENT DOCUMENTS

| | | | |
|---|---|---|---|
| 5,044,634 | 9/1991 | Dudley | 273/32 R |
| 5,289,369 | * 2/1994 | Hirshberg | 705/13 |
| 5,438,319 | 8/1995 | Zeytoonjian et al. | 340/571 |
| 5,438,518 | 8/1995 | Bianco et al. | 364/460 |

FOREIGN PATENT DOCUMENTS

| | | |
|---|---|---|
| 657 329 | 8/1986 | (CH) . |
| 2 535 491 | 5/1984 | (FR) . |
| 2 178 211 | 2/1987 | (GB) . |
| 2 280 509 | 2/1995 | (GB) . |

* cited by examiner

Primary Examiner—William A. Cuchlinski, Jr.
Assistant Examiner—Yonel Beaulieu
(74) Attorney, Agent, or Firm—Smith-Hill and Bedell

(57) ABSTRACT

The invention concerns an information system for displaying in a vehicle used to transport at least one person playing golf. This system comprises a base station which is located in the area of a club or a course and which has a control and a memory for the acquisition of travel data and other information; a control unit arranged in the vehicle which has at least a first control logic for processing and displaying the travel data and a second control logic for processing and displaying further information on a graphic display arranged in the vehicle; an interface provided at both the base station and the vehicle for the transmission of at least travel data and further information between the base station and the control unit, where the control unit compares the travel data transmitted and/or generated by the operation of the vehicle with predetermined reference values and, depending on the result of the comparison, stores/changes and/or displays actual travel data on the display and/or directly affects the operation of the vehicle, and the second control logic displays the additional information on the graphic display depending on the travel data and/or the operating state of the vehicle. The invention also concerns a chip-card based accounting system for driven machines and vehicles, especially golf carts.

23 Claims, 1 Drawing Sheet

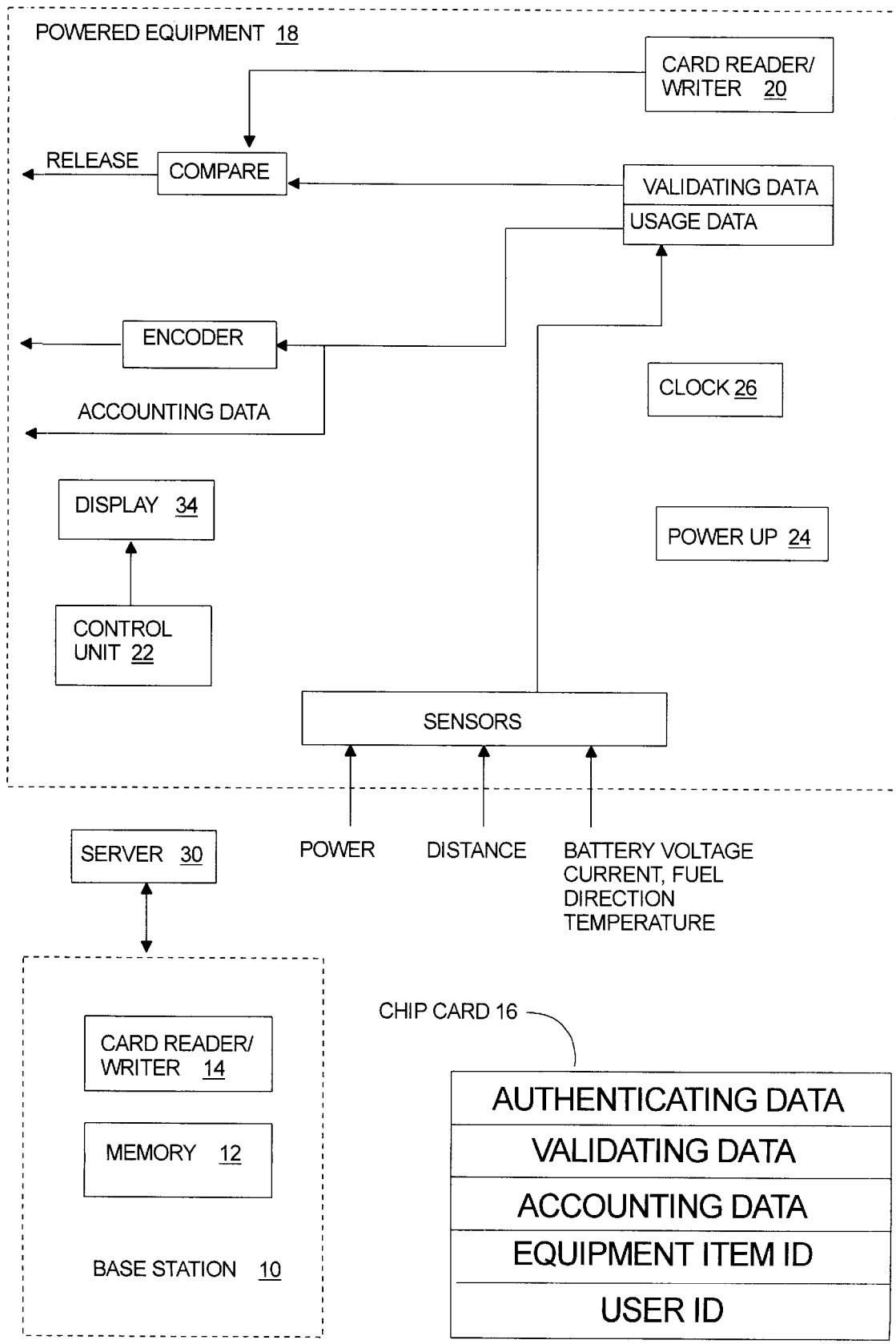

INFORMATION SYSTEM FOR GOLF CARTS AND SYSTEM FOR CALCULATION OF USE AND/OR ACQUISITION OF USE DATA

The present invention relates to an information system for displaying data on a vehicle used to transport at least one golfer.

It is known to use small vehicles for golfer transportation on golf courses, these vehicles being designed to accommodate at least one golfer and his golfing kit. These nimble compact vehicles are provided with wide tyres to avoid damage to the turf, they usually being powered by an internal combustion engine or an electric motor.

It is also known to equip such vehicles with a display, e.g. a speedometer for travel data display.

It is furthermore known from DE 42 02 130 A1 to provide a display of significant golfing data. In this German application the golf cart mounts a distance sensor and a control unit provided with a display in which golf course data is stored so that via the distance measurement by means of the distance sensor the approximate distance away of a hole can be indicated. Such data may also be used for producing further data such as e.g. proposals as to which type of golf iron is to be selected.

It is the object of the present invention to provide a system permitting display of further information on a display of the vehicle relating to operation of the vehicle or an input.

This object is achieved by an information system having the features of claim 1. The information system in accordance with the invention is based on a base station located within the area of a club or course. This base station contains a control and a memory for the acquisition of travel data and other information such as e.g. advertising commercials. Configured on the vehicle is a control unit comprising at least one first control logic for processing and displaying the vehicle travel data and a second control logic for processing and displaying further information on a graphic display arranged on the vehicle.

To make data swapping possible between base station and vehicle both the control of the base station and the control unit of the vehicle are provided with an interface for transferring at least travel data and further information between the base station control and the control unit on the vehicle. This transfer may be done via cable, wireless or by means of a storage medium which is first inserted in the base station where it is written, before then being inserted in the interface of the control unit on the vehicle. This control unit then compares the travel data received on transfer and/or resulting from vehicle operation to predetermined reference values to then memorize either the result of comparison as the updated travel data and/or indicate in the display a message derived from the result of comparison and/or affect further vehicle operation.

Possible travel data would be e.g. personal access authorization for vehicle usage, a vehicle usage account, ID data of vehicle user, vehicle mileage, speed, battery charge or fuel level, condition of vehicle system components such as e.g. brake linings, engine oil and time data such as e.g. start, duration, breaks and end of trip, totalized vehicle travel time, duration for displaying further information.

The second control logic of the control unit on the vehicle displays further information such as e.g. advertising commercials, on the graphic display as a function of the travel data and/or the operating status of the vehicle. Accordingly, a commercial may appear on the display when the vehicle is started by the golfer. Just as well, a commercial could be included in the display when the vehicle is not used for a lengthy period and/or no data has been input for a lengthy period via an entry keypad for game data. The commercial may then be displayed in a similar way as in a screen saver mode of a computer. The second control logic for analyzing and displaying the further data monitors the travel data or operating status of the vehicle at defined points in time, such as e.g. on commencement and end of usage, or continually or in defined time intervals. In this way the second control logic is able to assure that the display of the further information does not occur at points in time which are relevant to vehicle safety, e.g. when the vehicle is on the move, or at points in time in which the display is busy with the entry and display of game data.

This is why preferably the control unit on the vehicle is provided with a third control logic for processing and displaying game data. In this case a device for entering game data into the control unit is also arranged on the vehicle.

Preferably the data transferred from the base station to the control unit on the vehicle directly, or indirectly via a storage medium is made use of to regulate personal access to the vehicle. In this sense, for example, data could be transferred which indicates whether the person about to make use of the vehicle has the right to do so, or to charge the account of this person for using the vehicle in on-going operation. In this way, vehicle allocation to club members can be monitored and regulated. Thus, e.g. the data transfer between the base station and the vehicle can be handled in principle via storage media, each club member having in this case such a storage medium e.g. a chip card on which a user account and ID member data are memorized. Prior to vehicle use the storage medium would need to be updated in the base station and subsequently inserted into the corresponding interface on the vehicle. The vehicle could then immediately undertake identifying the club member or a guest and release or prohibit the vehicle for use. During usage an amount could be charged to the user account as a function of the usage duration of the vehicle or its distance-gone. In addition vehicle travel data such as e.g. fuel/oil level, battery charge and other data relative to the vehicle such as e.g. distance-gone, hours of use, servicing intervals etc. could be memorized on the storage medium, this data possibly being made use of when read into the base station to assist automating vehicle maintenance.

Use of the vehicle could also be supported by suitable sponsors, such as e.g. firms contributing towards vehicle upkeep by their advertising commercials being displayed on the vehicle in kind. For this purpose a graphic display is needed which presents the commercials by attractive means. By means of the information system in accordance with the invention it is possible to display this commercial on the graphic display of the vehicle targetted to specific points in time.

Preferably the base station of a club or course is connected to a data transfer network via a modem or wireless. Such a network may be a conventional cable network or a wireless network. Via the data transfer network the base stations of several clubs or courses are preferably connected to a server which regulates allocation of further information. This server is able to update or modify the data status of further information at regular or irregular intervals. In this way using the graphic displays on the golf carts as commercial displays can be automated. The revenue from displaying this further information may be used to cover the vehicle fleet costs, thus greatly relieving clubs and ultimately their members from having to bear the hitherto high vehicle costs.

It is furthermore possible that travel data such as e.g. vehicle wear/tear or maintenance data is transmitted from the various base stations to the server thus making it possible to target application of a central maintenance service by it being evident from this travel data when the various vehicles in specific clubs are in need of being serviced.

As an alternative to the information system as discussed above in which the travel data and further information are transferred in common from the base station to the vehicle it is also possible to transfer this data seperately. Since the data for the further information in their form as graphic data take up a lot of memory space it is also possible to transfer this data to the vehicle by cable e.g. together with charging the batteries on electric-powered vehicles. Transferring the travel data could then be done with the aid of the storage media, e.g. the chip card.

It would be furthermore possible to do away with using storage media altogether so that all data is transferred directly from the base station to a vehicle, e.g. by means of cable. In this case a club member could enter his PID No. enabling the vehicle to "see" which club member is about to use the vehicle. The memory for the user account of this club member would then be arranged in the vehicle and the memorized data would be transferred in the next transfer action to the base station for updating. It is likewise possible to swap data between base station and vehicle by a regional wireless network, as a result of which data could be continually updated between base station and vehicle. In this way it would also be possible to signal the user of the vehicle located somewhere on the golf cart with a message, e.g. that a telephone call has just been received for him, or signalling an emergency when the user is a doctor.

For capturing momentary travel data of the vehicle the control unit provided on the vehicle may be connected to various sensors such as e.g. spacing sensors, fuel gauges, distance-gone sensors, engine temperature sensors etc. Indeed, not only travel data may be obtained via the vehicle but also game data such as e.g. the distance gone by the golf ball from strike to stop. This distance may be established by the distance-gone sensor coupled to the speedo, connecting one of the vehicle wheels.

Data transfer between the control unit on the vehicle and the base station may be achieved either by cable, by chip cards, by transponder, by infrared means, by laser sensing means or by means of a wireless connection. Also usable are means of transfer hitherto not having become popular. The base station may be a computer provided with the necessary peripheral items such as memories, input and output hardware.

In the case of an electric-powered vehicle the graphic display may be battery-operated. In the case of a vehicle powered by an internal combustion engine operation could be made via the dynamo of the internal combustion engine, whereby an accumulator may be provided for independent operation of the display. In this way it is possible to display information before the engine has been started.

The graphic display preferably comprises a high-resolution graphics array e.g. 240×320 pixels so that the further information can be displayed with the desired resolution. Suitable as the display are monochrome or color LCD displays. Although using crt monitors makes little sense due to their high energy requirement, this is not excluded.

The base station may be connected to a weather sensing station capable of sensing humidity, prevailing wind direction and force. This data can be likewise transferred from the base station to the control unit on the vehicle and indicated in the display where it can be used in assisting iron selection and direction of strike, thus also enabling the game itself to be improved.

The golfer is able to have his score as memorized on the chip card to be printed out on a score card in the club house.

THE INVENTION RELATES ALSO TO A SYSTEM FOR USAGE ACCOUNTING AND/OR USAGE DATA ACQUISITION OF ELECTRICALLY OR ENGINE-POWERED EQUIPMENT

Nowadays many firms use electrically or engine-powered items of equipment on loan, rent or lease to save on the investment costs and thus remain liquid.

Accounting such services is done as a rule, time-dependent, on the one hand, but also duty-dependent, on the other, i.e. as a function of duration and intensity of usage. This latter data is acquired either from an adometer or duty-hour counter or is documented in writing by users. However, such information may be falsified by tampering with the duty-hour counter or distance-gone counter or intentionally wrong information may be provided, resulting in the true wear and tear of the equipment exceeding the level as calculated by the loan, rent or leasing company on the basis of the information received.

There is thus a requirement for these firms to be provided with a system which permits precise definition and/or accounting of related usage or accounting data.

One such system reads from the characterizing features of claim 12, advantageous further embodiments of the invention reading from the corresponding sub-claims.

In accordance with this aspect of the invention, as shown in the FIGURE of the drawings, on the premises of a loan, rent or leasing company, simply termed equipment provider in the following, a base station 10 is provided, incorporating a memory 12 for operating data, accounting data, any operating parameters etc. as may apply as well as a write/read means 14 for a chip card 16.

In addition, each item of equipment 18 is provided with write/read means 20 for the chip card thus making it possible to transfer usage data as well as accounting data between base station 10 and the item of equipment 18, it preferably also being possible to transfer reference data or other operating parameters, accounting tables etc. via the chip card 16 to the item of equipment 18.

So that the equipment item can be put to use the person or company using it needs to receive a chip card 16 from the equipment provider enabling the equipment user—i.e. the firm using the equipment on loan, rent or lease—to make use thereof.

It is not until the chip card 16 has been inserted in the write 20/read means of the equipment item 18 and the control unit of the equipment item has established that the chip card 22 in the write/read unit is valid that the equipment item is released for usage. Data materializing from operation of the equipment item such as commencement, duration, end and intensity of use, etc. are then acquired in usage data and memorized on the chip card. In addition or as an alternative thereto, accounting data may also be generated right away from this usage data which is then stored on a separate location on the chip card or added to already existing amounts or deducted from an existing total.

On return of the equipment item the equipment provider is immediately able to recognize from the usage or accounting data to what extent the item of equipment has been used. Time-dependent usage such as e.g. cheaper usage on a weekend etc. can be acquired in this way at the same time and included in accounting.

By specifying its hardware and software accordingly the chip card can be configured so that it can only be read and written by the equipment item in the base station for which it is intended.

Integrated preferably in the control unit on the equipment item is a power circuit 24 of the electrically or engine-powered equipment item for detecting power up of the equipment item, thus rendering falsification of power up acquisition practically impossible.

It is furthermore possible to connect a variety of sensors such as e.g. distance sensors, temperature sensors as well as a clock 26 to the control unit thus making it possible to obtain time-related travel data providing information as to capacity and scope of usage and the operating parameters.

On return of the equipment item the equipment provider receives the chip card and is then able to undertake a precise accounting and estimation of wear and tear of the equipment item on the basis of the data memorized on the chip card.

Of course, not only chip cards but also magnetic card and other writable data carriers may be used as the storage medium.

Vehicles, machines and equipment of all kinds, be they electrically powered, engine powered or pneumatically/hydraulically powered, as well as lifting platforms and, for instance, golf carts are suitable as such equipment items.

When not only the accounting data but also the travel data are to be read from the chip card at the base station, it is possible to check as a whole the correctness of the accounting data read from the chip card.

Should a serious discrepancy exist, the vehicle can then be checked.

It is furthermore possible to provide in the equipment item a buffered or permanent memory storing all travel data. In this case the travel data received via the chip card can be compared to the other to thus test whether data has been falsified on the chip card.

Of course, commercially available hardware and software coding methods such as e.g. PGP can be employed for data-coding the chip card, thus making falsification of this data by the equipment user practically impossible.

In one alternative embodiment of the invention a certain credit amount is stored on the chip card as is usual for a telephone card. When the equipment item is used the validity of this card is checked and subsequently in usage of the equipment item the corresponding usage data such as e.g. duration and intensity of use deducted from the chip card. Once the credit amount stored on the chip card has been exhausted the equipment item can no longer be put into operation thereby and the chip card needs to be revalidated by the equipment provider.

The chip card may comprise a storage location for usage data such as e.g. time period, duration, intensity of use, operating parameters and ID data such as e.g. type, number, user of the equipment item as well as reference, design or comparison data transferred by the equipment provider from the base station to the internal memory of the equipment item where it serves as the basis for later validation and accounting cycles. In this way customized accounting parameters such as e.g. rebates can be transferred to the equipment item and thus taken into consideration in accounting procedures internal to the equipment item. By a corresponding set of data on the cards dedicated modes of accounting equipment items and customers can be achieved. Furthermore, such data may contain e.g. time-related data tables, fuel prices, etc. needing to be continually updated, thus also facilitating such updating via the chip card. Accordingly, a storage location exists on the chip card for the type of card involved which then automatically prompts the control unit on the equipment item to undertake the corresponding operations. An update card inserted into the equipment item solely by the equipment provider thus automatically updates the reference, comparison and design data, whereas insertion of a usual loan card merely queries and defines the validity and/or credit standing of the card, the chip card remaining in the write/read means during operation of the equipment item. This is why the chip card is preferably retained in the equipment item and not released until usage has been completed, thus excluding falsification of the card during usage. Also possible are combination cards which update the set of data in the equipment item as well as enable use of the equipment item.

When the equipment provider has many branch offices or markets the equipment item at many different locations, the base stations at these locations are preferably interconnected via the telephone system 28 to a central server 30 which updates in the base station usage data, such as e.g. price of usage, thus ensuring uniform accounting.

The advantage materializing for the equipment provider from the above invention is that the data received as to usage of the equipment item is absolutely safe and reliable, thus enabling the prices for loan, leasing and renting the equipment item to be calculated corresponding precisely.

In addition, precisely acquiring the operating periods enables costs to be tabulated which in turn permit providing equipment during "off" periods at cut-rate prices to thus achieve optimum exploitation of available capacity.

One application of the above invention to major advantage materializes e.g. on golf courses. In this arrangement an equipment provider, either an out-sourced golf cart loan company or the golf club itself has a base station at which the user cards for the golf carts are issued. The prices for using the carts are graduated according to the periods of usage. Every user of the system needs to have a guest card or a member card for using the golf cart.

To make use of a golfing vehicle the card has to be inserted in the slot of the write/read means incorporated in the golf cart, upon which the control unit on the golfing vehicle checks whether the card is valid. As long as the cart is used the travel data or this data already converted into the accounting data is written on the chip card or booked from the equivalent account existing on the chip card, from which on return in the base station in the club house the actual costs of usage can be calculated on the basis of the data stored or updated on the chip card.

It is possible to also provide on the chip card a storage location for identifying the equipment item so that any one chip card can only be used for a specific item of equipment or a specific group of equipment.

The control unit on the equipment item is preferably powered via the power supply of the equipment item. In addition, a separate battery may be provided as a standby supply in cases when the central power supply is down. Should such a separate power supply be provided an accumulator is preferably used which is automatically recharged during operation of the equipment item.

The control unit on the equipment item may, of course, comprise an alphanumeric or graphic display 34 for indicating the data pertinent to usage, accounting or other operating or accounting parameters.

The direction of travel can be generated via a GPS or internal compass system and included in the data acquired as to usage, thus enabling more or less the distance-gone to be acquired. The clock internal to the equipment item generates preferably not only the time of day but also the date, thus making individual accounting as a function of time possible, e.g. higher or more favorable rates on the weekend and/or during the usual working hours.

What is claimed is:

1. A system for acquiring usage data relating to an item of powered equipment provided to a user by an equipment provider, comprising:

a chip card to be issued to a user of the item of powered equipment, a base station in the area of the equipment provider, said base station including a memory for storing usage data and a read means for reading data from said chip card, a control unit provided on the item of powered equipment for acquiring usage data, and a write means provided on said item of powered equipment for writing usage data acquired by the control unit to said chip card, and wherein the control unit controls the write means to write usage data generated during operation of the item of powered equipment to the chip card for reading from the chip card by the read means at the base station.

2. A system according to claim 1, wherein the chip card stores authenticating data, the write means provided on said item of powered equipment is a read/write means for reading the authenticating data from the chip card, and the control unit stores validating data and includes a means for comparing the authenticating data with the validating data and releasing the item of powered equipment for operation by the user only in the event that the comparison returns a predetermined result.

3. A system according to claim 2, wherein the chip card includes a storage location for validating data, and the read means at the base station is a read/write means for writing validating data to the chip card, for transferring the validating data from the base station to the item of powered equipment.

4. A system according to claim 1, wherein the item of powered equipment includes a clock connected to said control unit for generating usage data.

5. A system according to claim 4, wherein the control unit includes a means for generating a set of data including duration of usage.

6. A system according to claim 5, wherein the write means provided on the item of powered equipment is a read/write means and the control unit converts the set of data into accounting data and writes the accounting data to a storage location of the chip card.

7. A system according to claim 5, wherein the write means provided on the item of powered equipment is a read/write means and the control unit converts the set of data into accounting data and combines the accounting data with accounting data previously stored at a storage location of the chip card.

8. A system according to claim 5, wherein the write means provided on the item of powered equipment is a read/write means, and the control unit stores the set of data on the chip card.

9. A system according to claim 1, wherein the item of powered equipment includes a power sensing means for generating usage data, the power sensing means being connected to the control unit whereby the usage data can be acquired.

10. A system according to claim 1, wherein the item of powered equipment includes a means for sensing distance traveled, the sensing means being connected to the control unit for acquiring usage data.

11. A system according to claim 1, including a central server and wherein the base station is connected via an interface to a data transfer network for transferring data between the central server and the base station.

12. A system according to claim 1, wherein the item of powered equipment includes sensors for sensing usage of the equipment and generating usage data to be acquired by the control unit.

13. A system according to claim 12, wherein the sensors sense one or more of battery voltage, current flow, fuel level, distance traveled, direction of travel and temperature of drive components.

14. A system according to claim 1, wherein the item of powered equipment is a powered golfing vehicle and the base station is located in a clubhouse of a golf course.

15. A system according to claim 1, wherein the write means provided on said item of powered equipment is a read/write means and the control unit includes a memory which stores reference data and the read/write means reads data from the chip card, compares the data read from the chip card with the reference data and activates said item of powered equipment if the comparison returns a predetermined result.

16. A system according to claim 1, wherein the control unit includes a means for encoding the usage data and the write means writes the usage data in encoded form to said chip card.

17. A system according to claim 1, wherein said chip card includes a storage location for the specific item of powered equipment.

18. A system according to claim 1, for providing accounting data to the base station, and wherein the chip card stores accounting data specific to the user of the item of powered equipment.

19. A system according to claim 18, wherein the write means provided on the item of powered equipment writes accounting data specific to said item of powered equipment to said chip card.

20. A method of acquiring usage data relating to an item of powered equipment provided to a user by an equipment provider, there being a base station in the area of the equipment provider, said method comprising:

issuing a chip card to the user of the item of powered equipment, providing the item of powered equipment with a control unit for acquiring usage data and a write means for writing usage data acquired by the control unit to the chip card, employing the control unit to control the write means to write usage data generated during operation of the item of powered equipment to the chip card, and providing said base station with a memory for storing usage data and a read means for reading data from the chip card.

21. A method according to claim 20, wherein the chip card stores authenticating data, the write means on the item of powered equipment is a read/write means, and the control unit stores validating data, and the method further comprises employing the read/write means to read the authenticating data from the chip card, comparing the authenticating data with the validating data, and releasing the item of powered equipment for operation by the user only in the event that the comparison returns a predetermined result.

22. A method according to claim 20, comprising generating data including duration of usage and writing the data to the chip card.

23. A method according to claim 20, wherein the base station is connected via an interface to a data transfer network and the method comprises transferring data between the base station and a central server over the data transfer network.

* * * * *